United States Patent
Jobs et al.

(10) Patent No.: US 8,090,087 B2
(45) Date of Patent: Jan. 3, 2012

(54) METHOD, SYSTEM, AND GRAPHICAL USER INTERFACE FOR MAKING CONFERENCE CALLS

(75) Inventors: Steven P. Jobs, Palo Alto, CA (US); Greg Christie, San Jose, CA (US); Bas Ording, San Francisco, CA (US); Imran Chaudhri, San Francisco, CA (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1177 days.

(21) Appl. No.: 11/553,429

(22) Filed: Oct. 26, 2006

(65) Prior Publication Data

US 2008/0100693 A1    May 1, 2008

(51) Int. Cl.
*H04M 11/00* (2006.01)
(52) U.S. Cl. ............... 379/93.21; 379/158; 379/202.01; 379/204.01; 379/207.01; 379/215.01
(58) Field of Classification Search .............. 379/93.21, 379/158, 202.01, 204.01, 207.01, 93.35, 379/215.01; 455/414.1, 566
See application file for complete search history.

(56) References Cited

U.S. PATENT DOCUMENTS

| | | | |
|---|---|---|---|
| 5,619,555 A | 4/1997 | Fenton et al. ................... 379/67 |
| 5,627,978 A | 5/1997 | Altom et al. ................... 395/330 |
| 5,633,912 A | 5/1997 | Tsoi ................... 379/58 |
| 5,644,628 A | 7/1997 | Schwarzer et al. ........ 379/93.19 |
| 5,701,340 A | 12/1997 | Zwick ........................... 379/204 |
| 6,026,158 A | 2/2000 | Bayless et al. ................. 379/355 |
| 6,047,054 A * | 4/2000 | Bayless et al. ........... 379/202.01 |
| 6,070,068 A | 5/2000 | Sudo .............................. 455/414 |
| 6,088,696 A | 7/2000 | Moon et al. ...................... 707/10 |
| 6,236,854 B1 | 5/2001 | Bradshaw, Jr. ................ 455/416 |
| 6,259,436 B1 | 7/2001 | Moon et al. .................... 345/173 |
| 6,269,159 B1 * | 7/2001 | Cannon et al. ........... 379/202.01 |
| 6,298,045 B1 | 10/2001 | Pang et al. ..................... 370/261 |
| 6,323,846 B1 | 11/2001 | Westerman et al. .......... 345/173 |
| 6,392,999 B1 | 5/2002 | Liu et al. ........................ 370/260 |
| 6,396,531 B1 | 5/2002 | Gerszberg et al. ......... 348/14.01 |

(Continued)

FOREIGN PATENT DOCUMENTS

DE    199 83 569 T1    10/2001

(Continued)

OTHER PUBLICATIONS

Nokia 7280: Interactive Demonstrations :: nokia.com/EUROPE_NOKIA_COM_3/r2/support/tutorials/7280/english/index.html; 2004.*

(Continued)

*Primary Examiner* — Olisa Anwah
(74) *Attorney, Agent, or Firm* — Morgan, Lewis & Bockius LLP

(57) ABSTRACT

A user interface for handling multiple calls includes displaying an image associated with a first party on a first call and an image associated with a second party on a second call. When one call is active and the other call is on hold, the image associated with the party that is on the active call is visually highlighted to make it more visually prominent relative to the other image. When both calls are joined into a conference call, both images are displayed adjacent to each other and neither is visually highlighted relative to the other.

35 Claims, 9 Drawing Sheets

U.S. PATENT DOCUMENTS

| | | | |
|---|---|---|---|
| 6,424,711 B1 | 7/2002 | Bayless et al. | 379/355.09 |
| 6,430,284 B1 | 8/2002 | Jones | 379/229 |
| 6,505,040 B1 | 1/2003 | Kim | 455/416 |
| 6,516,202 B1* | 2/2003 | Hawkins et al. | 455/556.2 |
| 6,535,730 B1 | 3/2003 | Chow et al. | 455/416 |
| 6,570,557 B1 | 5/2003 | Westerman et al. | 345/173 |
| 6,577,721 B1 | 6/2003 | Vainio et al. | 379/202.01 |
| 6,583,806 B2* | 6/2003 | Ludwig et al. | 348/14.08 |
| 6,677,932 B1 | 1/2004 | Westerman | 345/173 |
| 6,768,722 B1 | 7/2004 | Katseff et al. | 370/260 |
| 6,839,417 B2 | 1/2005 | Weisman et al. | 379/204.01 |
| 7,007,239 B1 | 2/2006 | Hawkins et al. | 715/780 |
| 7,031,728 B2 | 4/2006 | Beyer, Jr. | 455/456.3 |
| 7,046,230 B2 | 5/2006 | Zadesky et al. | 345/156 |
| 7,050,557 B2 | 5/2006 | Creamer et al. | 379/205.01 |
| 7,184,428 B1 | 2/2007 | Gerszberg et al. | 370/352 |
| 7,185,058 B2 | 2/2007 | Blackwell et al. | 709/206 |
| 7,231,208 B2* | 6/2007 | Robertson et al. | 455/416 |
| 7,251,479 B2 | 7/2007 | Holder et al. | 455/412.2 |
| 7,289,614 B1 | 10/2007 | Twerdahl et al. | 379/142.01 |
| 7,295,852 B1 | 11/2007 | Davis et al. | 455/518 |
| 7,479,949 B2* | 1/2009 | Jobs et al. | 345/173 |
| 7,495,659 B2 | 2/2009 | Marriott et al. | 345/173 |
| 7,499,040 B2 | 3/2009 | Zadesky et al. | 345/204 |
| 7,509,588 B2 | 3/2009 | Van Os et al. | 715/835 |
| 7,614,008 B2 | 11/2009 | Ording | 715/773 |
| 7,650,137 B2 | 1/2010 | Jobs et al. | 455/405 |
| 7,653,883 B2 | 1/2010 | Hotelling et al. | 715/863 |
| 7,657,849 B2 | 2/2010 | Chaudhri et al. | 715/863 |
| 7,663,607 B2 | 2/2010 | Hotelling et al. | 345/173 |
| 7,680,513 B2 | 3/2010 | Haitani et al. | 455/556.2 |
| 7,685,530 B2 | 3/2010 | Sherrard et al. | 715/764 |
| 7,694,231 B2 | 4/2010 | Kocienda et al. | 715/773 |
| 7,720,218 B2* | 5/2010 | Abramson et al. | 379/428.03 |
| 7,808,479 B1 | 10/2010 | Hotelling et al. | 345/163 |
| 7,844,914 B2 | 11/2010 | Andre et al. | 715/773 |
| 2001/0049283 A1 | 12/2001 | Thomas | 455/426 |
| 2002/0015024 A1 | 2/2002 | Westerman et al. | 345/173 |
| 2002/0045438 A1 | 4/2002 | Tagawa et al. | 455/412 |
| 2002/0073207 A1* | 6/2002 | Widger et al. | 709/227 |
| 2002/0077158 A1* | 6/2002 | Scott | 455/567 |
| 2002/0093531 A1* | 7/2002 | Barile | 345/753 |
| 2002/0128036 A1 | 9/2002 | Yach et al. | 455/552 |
| 2003/0073430 A1 | 4/2003 | Robertson et al. | 455/416 |
| 2003/0138080 A1 | 7/2003 | Nelson et al. | 379/88.16 |
| 2003/0142138 A1 | 7/2003 | Brown et al. | 345/797 |
| 2003/0142200 A1 | 7/2003 | Canova, Jr. et al. | 348/14.08 |
| 2003/0198329 A1 | 10/2003 | McGee | 379/202.01 |
| 2004/0047461 A1 | 3/2004 | Weisman et al. | 379/202.01 |
| 2004/0203674 A1* | 10/2004 | Shi et al. | 455/415 |
| 2005/0015495 A1 | 1/2005 | Florkey et al. | 709/227 |
| 2005/0048958 A1 | 3/2005 | Mousseau et al. | 455/415 |
| 2005/0074107 A1 | 4/2005 | Renner et al. | 379/202.01 |
| 2005/0078613 A1 | 4/2005 | Covell et al. | 370/260 |
| 2005/0094792 A1 | 5/2005 | Berthoud et al. | 379/202.01 |
| 2005/0101308 A1 | 5/2005 | Lee | 455/416 |
| 2005/0123116 A1* | 6/2005 | Gau | 379/202.01 |
| 2005/0157174 A1 | 7/2005 | Kitamura et al. | 345/207.99 |
| 2005/0286693 A1 | 12/2005 | Brown et al. | 379/114.28 |
| 2006/0002536 A1 | 1/2006 | Ambrose | 379/201.01 |
| 2006/0015819 A1 | 1/2006 | Hawkins et al. | 715/780 |
| 2006/0026521 A1 | 2/2006 | Hotelling et al. | 715/702 |
| 2006/0026535 A1 | 2/2006 | Hotelling et al. | 715/863 |
| 2006/0026536 A1 | 2/2006 | Hotelling et al. | 715/863 |
| 2006/0030369 A1 | 2/2006 | Yang | 455/566 |
| 2006/0033724 A1 | 2/2006 | Chaudhri et al. | 345/173 |
| 2006/0035632 A1 | 2/2006 | Sorvari et al. | 455/418 |
| 2006/0063539 A1 | 3/2006 | Beyer, Jr. | 455/456.3 |
| 2006/0121925 A1 | 6/2006 | Jung | 455/518 |
| 2006/0132595 A1 | 6/2006 | Kenoyer et al. | 348/14.08 |
| 2006/0161870 A1 | 7/2006 | Hotelling et al. | 715/863 |
| 2006/0168539 A1 | 7/2006 | Hawkins et al. | 715/780 |
| 2006/0178137 A1 | 8/2006 | Loveland | 455/414.1 |
| 2006/0181517 A1 | 8/2006 | Zadesky et al. | 345/173 |
| 2006/0197753 A1 | 9/2006 | Hotelling | 345/173 |
| 2006/0199612 A1 | 9/2006 | Beyer, Jr. et al. | 455/556.2 |
| 2006/0205432 A1 | 9/2006 | Hawkins et al. | 455/552.1 |
| 2006/0222168 A1 | 10/2006 | Curley et al. | 379/267 |
| 2006/0264205 A1 | 11/2006 | Gibbs | 455/413 |
| 2006/0281449 A1 | 12/2006 | Kun et al. | 455/418 |
| 2007/0082697 A1 | 4/2007 | Bumiller et al. | 455/552.1 |
| 2007/0091830 A1 | 4/2007 | Coulas et al. | 370/260 |
| 2007/0111743 A1 | 5/2007 | Leigh et al. | 455/518 |
| 2007/0115919 A1 | 5/2007 | Chahal et al. | 370/352 |
| 2007/0116226 A1 | 5/2007 | Bennett et al. | 379/202.01 |
| 2007/0117508 A1 | 5/2007 | Jachner | 455/3.06 |
| 2007/0123239 A1 | 5/2007 | Leigh et al. | 455/416 |
| 2007/0123320 A1* | 5/2007 | Han et al. | 455/575.1 |
| 2007/0133771 A1 | 6/2007 | Stifelman et al. | 379/142.01 |
| 2007/0149188 A1 | 6/2007 | Miyashita et al. | 455/426.1 |
| 2007/0150830 A1 | 6/2007 | Ording et al. | 715/784 |
| 2007/0152980 A1 | 7/2007 | Kocienda et al. | 345/173 |
| 2007/0152984 A1 | 7/2007 | Ording et al. | 345/173 |
| 2007/0155434 A1 | 7/2007 | Jobs et al. | 455/565 |
| 2007/0257890 A1 | 11/2007 | Hotelling et al. | 345/173 |
| 2008/0168361 A1 | 7/2008 | Forstall et al. | 715/753 |
| 2009/0280868 A1* | 11/2009 | Hawkins et al. | 455/566 |
| 2010/0273466 A1* | 10/2010 | Robertson et al. | 455/416 |

FOREIGN PATENT DOCUMENTS

| | | |
|---|---|---|
| EP | 0 804 009 A2 | 10/1997 |
| EP | 0 859 498 A2 | 8/1998 |
| EP | 1 069 791 A1 | 1/2001 |
| EP | 1 621 983 A2 | 2/2006 |
| EP | 1 635 543 A1 | 3/2006 |
| EP | 1 763 243 A | 3/2007 |
| GB | 2 338 141 A | 12/1999 |
| WO | WO 97/08879 | 8/1996 |
| WO | WO 98/30002 A | 7/1998 |
| WO | WO 98/48551 A2 | 10/1998 |
| WO | WO 99/16181 A | 4/1999 |
| WO | WO 00/16186 A2 | 3/2000 |
| WO | WO 00/38042 A1 | 6/2000 |
| WO | WO 02/32088 A | 4/2002 |
| WO | WO 03/060622 A2 | 7/2003 |
| WO | WO 2004/031902 A2 | 4/2004 |
| WO | WO 2005/053279 A1 | 6/2005 |
| WO | WO 2006/070228 A2 | 7/2006 |

OTHER PUBLICATIONS

Audiovox PPC 5050 "To Answer or Reject a Call," 3 pages, printed Apr. 11, 2008.

iChat AV, "Videoconferencing for the Rest of Us," http://www.apple.com/macosx/features/ichat.html, printed Apr. 13, 2006, 3 pages.

Nokia-Enhancements, "Nokia Video Call Stand PT-8," printed Apr. 13, 2006, 2 pages.

Nokia-Phone Features, "Nokia 6630 Imaging Smartphone," http://europe.nokia.com/nokia/0,8764,58711,00.html, printed Apr. 13, 2006, 5 pages.

International Search Report and Written Opinion for International Application PCT/US2007/080971, mailed Apr. 15, 2008.

International Search Report and Written Opinion for International Application No. PCT/US2007/088884 mailed May 21, 2008.

Gears, "Orange SPV C600 Review," coolsmartphone.com, Apr. 14, 2006, 58 pages, http://www.coolsmartphone.com/article569.html.

Invitation to Pay Additional Fees dated Mar. 6, 2008, received in International Application No. PCT/US2007/077307, which corresponds to U.S. Appl. No. 11/769,694.

International Search Report and Written Opinion dated Jul. 22, 2008, recieved in International Application No. PCT/US2007/077307, which corresponds to U.S. Appl. No. 11/769,694.

International Search Report and Written Opinion dated Jan. 28, 2008, received in International Application No. PCT/US2007/077436, which corresponds to U.S. Appl. No. 11/769,695.

Office Action dated May 6, 2010, received in U.S. Appl. No. 11/769,694.

Final Office Action dated Oct. 14, 2010, received in U.S. Appl. No. 11/769,694.

Office Action dated Sep. 3, 2010, received in U.S. Appl. No. 11/769,695.

Final Office Action dated Jan. 21, 2011, received in U.S. Appl. No. 11/769,695.

Office Action dated Feb. 19, 2010, received in Australian Patent 2008203349, which corresponds to U.S. Appl. No. 11/769,695.
Office Action dated Oct. 9, 2009, received in Australian Patent 2009100723, which corresponds to U.S. Appl. No. 11/769,695.
Office Action dated Oct. 5, 2009, received in Australian Patent Application No. 2009100722, which corresponds to U.S. Appl. No. 11/769,695.
Office Action dated Sep. 14, 2010, received in German Patent 11 207 001 109.2, which corresponds to U.S. Appl. No. 11/769,695.

Office Action dated Aug. 13, 2009, received in the European Patent Application 07 841 759.9 which corresponds to U.S. Appl. No. 11/769,695.
Office Action dated May 25, 2010, received in European Application No. 07 841 759.9, which corresponds to U.S. Appl. No. 11/769,695.
Office Action dated Oct. 28, 2010, received in U.S. Appl. No. 11/960,673.

* cited by examiner

METHOD, SYSTEM, AND GRAPHICAL USER INTERFACE FOR MAKING CONFERENCE CALLS

TECHNICAL FIELD

The disclosed embodiments relate generally to user interfaces, and more particularly, to a user interface for call waiting and conference calls.

BACKGROUND

As portable devices become more compact, and the amount of information to be processed and stored increases, it has become a significant challenge to design a user interface that allows users to easily interact with the device. This is unfortunate since the user interface is the gateway through which users receive not only content but also responses to user actions or behaviors, including user attempts to access a device's features or tools. Some portable communication devices (e.g., mobile phones) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user. In addition, as the number of pushbuttons has increased, the proximity of neighboring buttons often makes it difficult for users to activate a desired pushbutton.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

The interfaces for call waiting and conference calling that are currently available suffer the same shortcomings. Users are often at a loss as to the sequence of buttons to push in order to switch between calls or to make a conference call. Furthermore, the interface often does not convey intuitively the parties involved in the calls.

Accordingly, there is a need for more efficient interfaces for call waiting and conference calling.

SUMMARY

In accordance with some embodiments, a method includes establishing a first communication link between a first party and a user in response to a first action by the user, and displaying a first image corresponding to the first party at an intensity that is greater than a threshold. The method also includes establishing a second communication link between a second party and the user in response to a second action by the user while the first communication link is ongoing, and switching the user from the first communication link to the second communication link. The method further includes displaying a second image corresponding to the second party while continuing to display the first image, and visually highlighting the second image so as to facilitate visual differentiation of the first and second images.

In accordance with some embodiments, a graphical user interface includes a first image corresponding to a first party that is communicating with a device, and a second image corresponding to a second party that is communicating with the device. When a user of a device is communicating with the first party, the first image has an intensity greater than a threshold and the second image has an intensity less than the threshold. When the user is communicating with the second party, the first image has an intensity less than the threshold and the second image has an intensity greater than the threshold.

In accordance with some embodiments, there is a computer program product for use in conjunction with a portable communications device. The computer program product includes a computer readable storage medium and a computer program mechanism embedded therein. The computer program mechanism includes instructions for establishing a first communication link between a first party and a user in response to a first action by the user; instructions for displaying a first image corresponding to the first party at an intensity that is greater than a threshold; instructions for establishing a second communication link, while the first communication link is ongoing, between a second party and the user in response to a second action by the user; instructions for switching the user from the first communication link to the second communication link; instructions for displaying a second image corresponding to the second party while continuing to display the first image; and instructions for visually highlighting the second image so as to facilitate visual differentiation of the first and second images.

In accordance with some embodiments, a portable communications device includes a display, one or more processors, memory, and a program, wherein the program is stored in the memory and configured to be executed by the one or more processors. The program includes instructions for establishing a first communication link between a first party and a user in response to a first action by the user; instructions for displaying a first image corresponding to the first party at an intensity that is greater than a threshold; instructions for establishing a second communication link, while the first communication link is ongoing, between a second party and the user in response to a second action by the user; instructions for switching the user from the first communication link to the second communication link; instructions for displaying a second image corresponding to the second party while continuing to display the first image; and instructions for visually highlighting the second image so as to facilitate visual differentiation of the first and second images.

In accordance with some embodiments, a portable communications device includes display means, one or more processor means, memory means, and a program mechanism, wherein the program mechanism is stored in the memory means and configured to be executed by the one or more processors means. The program mechanism includes instructions for establishing a first communication link between a first party and a user in response to a first action by the user; instructions for displaying a first image corresponding to the first party at an intensity that is greater than a threshold; instructions for establishing a second communication link, while the first communication link is ongoing, between a second party and the user in response to a second action by the user; instructions for switching the user from the first communication link to the second communication link; instructions for displaying a second image corresponding to the second party while continuing to display the first image; and instructions for visually highlighting the second image so as to facilitate visual differentiation of the first and second images.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of user interfaces and associated processes for using a device are described. In some embodiments, the device is a portable communications device. The user interface may include a click wheel and/or touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. For simplicity, in the discussion that follows, a portable communications device (e.g., a cellular telephone that may also contain other functions, such as PDA and music player functions) that includes a click wheel is used as an exemplary embodiment. It should be understood, however, that the user interfaces and associated processes may be applied to other devices, such as personal computers and laptops, that may include one or more other physical user-interface devices, such as a keyboard, a mouse and/or a joystick.

The device may support a variety of applications, such as telephone, text messenger and a music player. The music player may be compatible with one or more file formats, such as MP3 and/or AAC. In an exemplary embodiment, the device includes an iPod music player (trademark of Apple Computer, Inc.).

The various applications that may be executed on the device may use at least one common physical user-interface device, such as the click wheel. One or more functions of the click wheel as well as corresponding information displayed on the device may be adjusted and/or varied from one application to the next and/or within a respective application. In this way, a common physical architecture (such as the click wheel) of the device may support the variety of applications with user interfaces that are intuitive and transparent.

Figure 1:
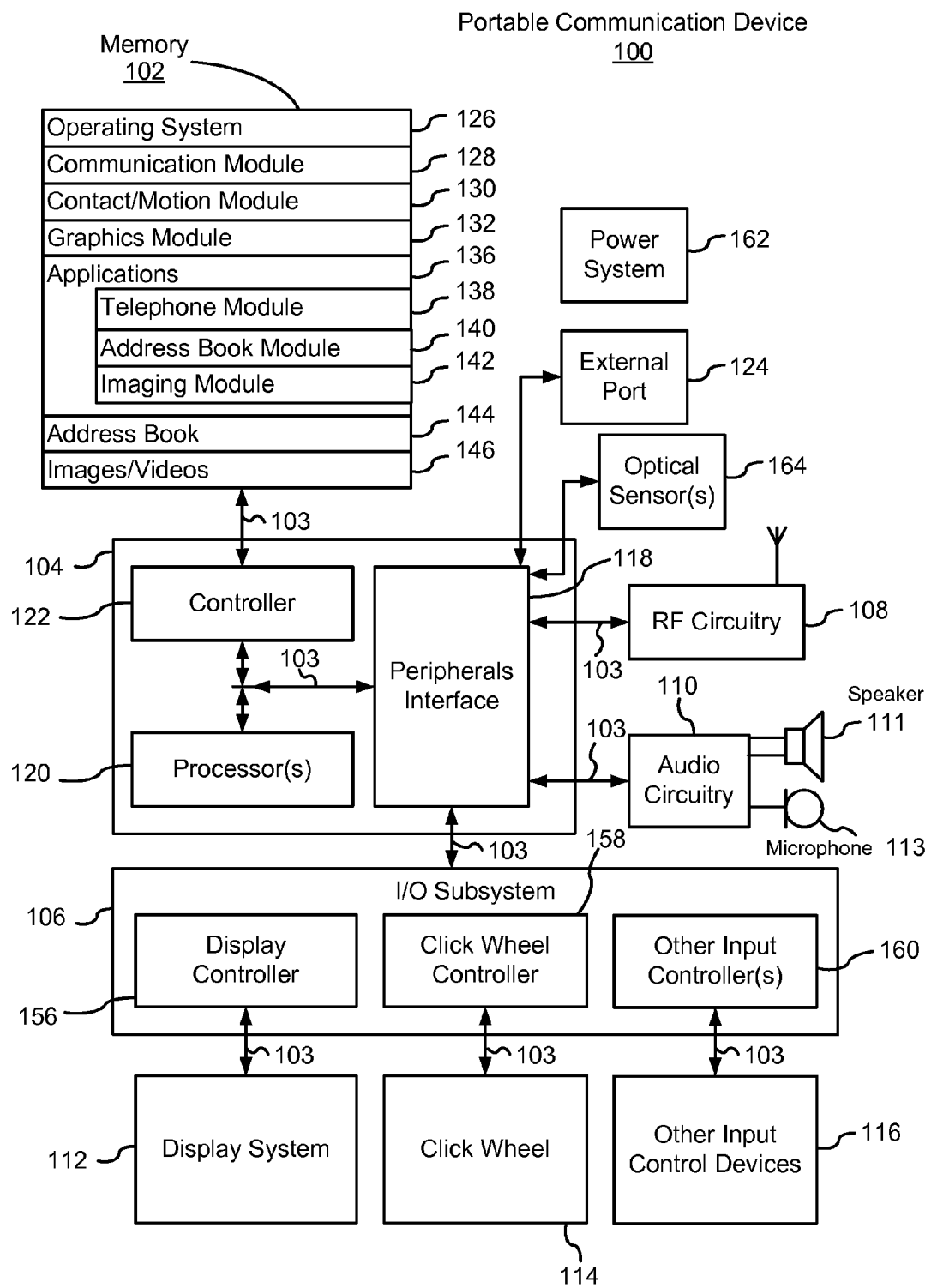
FIG. 1 is a block diagram illustrating a portable communications device in accordance with some embodiments.

Attention is now directed towards embodiments of the device. FIG. 1 is a block diagram illustrating an architecture for a portable communication device 100, according to some embodiments of the invention. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, a display system 112 (which may include a touch screen), a click wheel 114, other input or control devices 116, and an external port 124. The device 100 may optionally include optical sensors 164. These components may communicate over one or more communication buses or signal lines 103. The device 100 may be any portable electronic device, including but not limited to a handheld computer, a tablet computer, a mobile phone, a media player, a personal digital assistant (PDA), or the like, including a combination of two or more of these items, provided the device includes voice communication capabilities (e.g., telephony). In other embodiments, the device 100 may not be portable, such as a desktop personal computer.

It should be appreciated that the device 100 is only one example of a portable communications device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high speed random access memory and may also include non-volatile memory, such as one or more magnetic disk storage devices, flash memory devices, or other non-volatile solid state memory devices. In some embodiments, memory 102 may further include storage remotely located from the one or more processors 120, for instance network attached storage accessed via the RF circuitry 108 or the external port 124 and a communications network (not shown) such as the Internet, intranet(s), Local Area Networks (LANs), Wide Local Area Networks (WLANs), Storage Area Networks (SANs) and the like, or any suitable combination thereof. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., headphone for one or both ears) and input (e.g., microphone).

The I/O subsystem 106 couples input/output peripherals on the device 100, such as the display system 112, the click wheel 114 and other input/control devices 116, to the peripherals interface 118. The I/O subsystem 106 may include a display controller 156, a click wheel controller 158 and one or more input controllers 160 for other input or control devices. The one or more input controllers 160 receive/send electrical signals from/to other input or control devices 160. The other input/control devices 160 may include physical buttons (e.g., push buttons, rocker buttons, etc.), dials, slider switches, joysticks, and so forth.

The display system 112 provides an output interface and/or an input interface between the device and a user. The display controller 156 receives and/or sends electrical signals from/to the display system 112. The display system 112 displays visual output to the user. The visual output may include text, icons, graphics, video, and any combination thereof. In some embodiments, some or all of the visual output may correspond to user-interface objects, further details of which are described below.

In some embodiments, such as those that include a touch screen, the display system 112 also accepts input from the user based on haptic and/or tactile contact. In embodiments with a touch screen, the display system 112 forms a touch-sensitive surface that accepts user input. In these embodiments, the display system 112 and the display controller 156 (along with any associated modules and/or sets of instructions in memory 102) detect contact (and any movement or breaking of the contact) on the display system 112 and converts the detected contact into interaction with user-interface objects, such as one or more soft keys, that are displayed on a touch screen. In an exemplary embodiment, a point of contact between a touch screen in the display system 112 and the user corresponds to one or more digits of the user.

In embodiments with a touch screen, the touch screen in the display system 112 may use LCD (liquid crystal display) technology, or LPD (light emitting polymer display) technology, although other display technologies may be used in other embodiments. A touch screen in the display system 112 and the display controller 156 may detect contact and any movement or breaking thereof using any of a plurality of touch sensing technologies, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen in the display system 112 displays visual output from the portable device 100, whereas touch sensitive tablets do not provide visual output. The touch screen in the display system 112 may have a resolution in excess of 100 dpi. In an exemplary embodiment, the touch screen in the display system has a resolution of approximately 168 dpi. The user may make contact with the touch screen in the display system 112 using any suitable object or appendage, such as a stylus, a digit, and so forth.

In some embodiments, in addition to touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen in the display system 112 or an extension of the touch-sensitive surface formed by the touch screen.

The device 100 may include a click wheel 114. A user may navigate among one or more graphical objects (henceforth referred to as icons) displayed in the display system 112 by rotating the click wheel 114 or by moving (e.g., angular displacement) a point of contact with the click wheel 114. The click wheel 114 may also be used to select one or more of the displayed icons. For example, the user may press down on at least a portion of the click wheel 114 or an associated physical button. User commands and navigation commands provided by the user via the click wheel 114 may be processed by the click wheel controller 158 as well as one or more of the modules and/or sets of instructions in memory 102.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 142, the optical sensor 164 may capture still images or video.

In some embodiments, the software components stored in memory 102 may include an operating system 126, a communication module (or set of instructions) 128, a contact/motion module (or set of instructions) 130, a graphics module (or set of instructions) 132, and one or more applications (or set of instructions) 136. The applications module 136 may include a telephone module (or set of instructions) 138, an address book module (or set of instructions) 140 and/or an imaging module (or set of instructions) 142.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.).

The contact/motion module 130 may detect contact with the click wheel 114 and/or a touch screen in the display system 112 (in conjunction with the display controller 156). The contact/motion module 130 includes various software components for performing various operations related to detection of contact, such as determining if contact has occurred, determining if there is movement of the contact and tracking the movement across the click wheel 114 and/or a touch screen in the display system 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. In some embodiments, the contact/motion module 130 and the display controller 156 also detects contact on a touchpad.

The graphics module 132 includes various known software components for rendering and displaying graphics on the display system 112, including components for changing the intensity of graphics that are displayed. Note that the term "graphics" includes any object that can be displayed to a user, including without limitation text, web pages, icons (such as user-interface objects including soft keys), digital images, videos, animations and the like.

In addition to the telephone module 138, the address book module 140 and/or the imaging module 142, the one or more applications 136 may include any applications installed on the device 100, including without limitation, a browser, email, instant messaging, text messaging, word processing, keyboard emulation, widgets, JAVA-enabled applications, encryption, digital rights management, voice recognition, voice replication, location determination capability (such as that provided by the Global Positioning System (GPS)), etc.

In conjunction with the RF circuitry 108, the audio circuitry 110, the speaker 111, the microphone 113, the display system 112, the display controller 156, the click wheel 114 and/or the click wheel controller 158, the telephone module 138 may be used to enter a sequence of characters corresponding to a telephone number, access one or more telephone numbers in the address book 144, modify a telephone number that has been entered, dial a respective telephone number, conduct a conversation and disconnect or hang up when the conversation is completed. The telephone module 138 may also be used to receive a second call while a first call is already ongoing, without disconnecting the first call, or conduct a conference call.

In conjunction with the display system 112, the display controller 156, the click wheel 114 and/or the click wheel controller 158, the address book module 140 may be used to manage an address book or contact list 144, including adding a name to the address book 144, deleting a name from the address book 144, associating a phone number or other information with a name, associating an image with a name, categorizing and sorting names, and so forth.

In conjunction with the display system 112, the display controller 156, the click wheel 114, the click wheel controller 158, and the optical sensor(s) 164, the imaging module may be used to capture still images or video (including a video stream) 146 and store them into memory 102, modify characteristics of a still image or video, or delete a still image or video from memory 102.

In some embodiments, the device 100 is a device where operation of a predefined set of functions on the device is performed exclusively through a touch screen in the display system 112 and/or a touchpad. By using a touch screen and/or a touchpad as the primary input/control device for operation of the device 100, the number of physical input/control devices (such as push buttons, dials, and the like) on the device 100 may be reduced. In one embodiment, the device 100 includes a touch screen, a touchpad, a push button for powering the device on/off and locking the device, a volume adjustment rocker button and a slider switch for toggling ringer profiles. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 113.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

In some embodiments, the device 100 is a device where operation of a predefined set of functions on the device is performed exclusively or primarily through the click wheel 114. By using the click wheel 114 as the primary input/control device for operation of the device 100, the number of other physical input/control devices (such as push buttons, dials, and the like) on the device 100 may be reduced.

Figure 2:
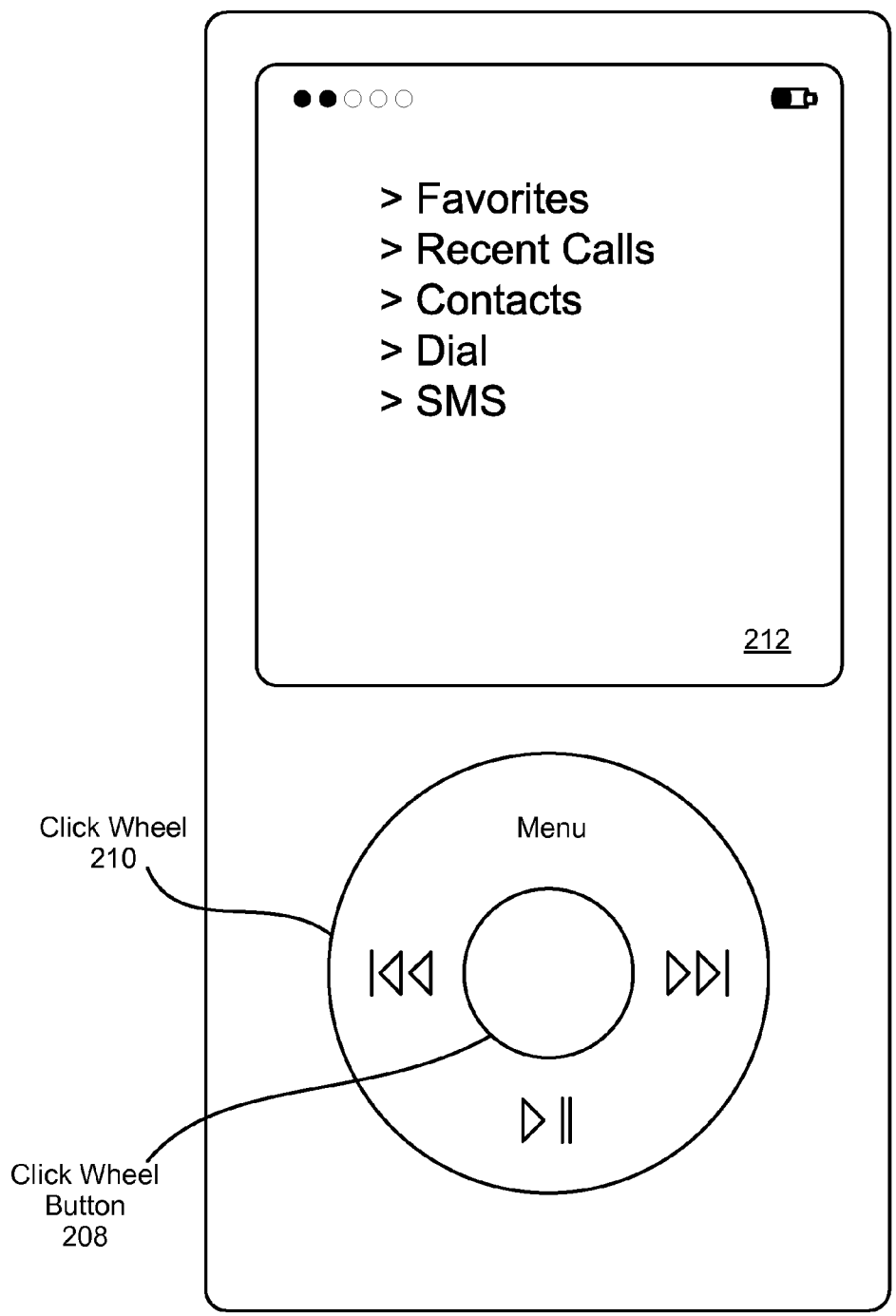
FIG. 2 illustrates a portable communications device having a click wheel input device in accordance with some embodiments.

Attention is now directed towards embodiments of user interfaces and associated processes that may be implemented on a portable communications device 200. FIG. 2 is a schematic diagram illustrating an embodiment of a portable communication device 200. The device 200 includes a click wheel 210 and a display 212. The click wheel constitutes a physical interface for receiving user commands (such as selection of one of more items and/or icons that are displayed on the display 212) and/or navigation commands (which may, for example, control scrolling through the items and/or icons that are displayed on the display 212). The user may use the click wheel 210 by touching it (making a point of contact) and then moving the point of contact while maintaining contact. Such angular displacement may indicate a navigation command to scroll through the items and/or icons that are displayed on the display 212. By pressing down on the click wheel 210, or on a click wheel button 208 (e.g., at the center of the click wheel), the user may select one or more items and/or icons that are displayed on the display 212. Thus, a pressing down gesture may indicate a user command corresponding to selection.

The device 200 may display a menu or hierarchy of the applications that may be executed or run on the device 200. For example, the displayed menu or hierarchy for the applications may include 'Favorites' for popular applications for this user, 'Recent' for calls that have been made, answered, and/or missed within a first pre-determined time period (such as the last day, week or month), 'Contacts' (which corresponds to the address book 144 in FIG. 1), 'Dial' (which corresponds to the telephone module 138 in FIG. 1) and 'SMS'. The menu or hierarchy may also include 'Music', 'Extras', 'Settings' and 'Now playing' icons (not shown in the Figures) that correspond to a music player module. The display 212 may also convey other information, such as an icon that indicates a remaining stored power level for the device 200.

Figure 3:
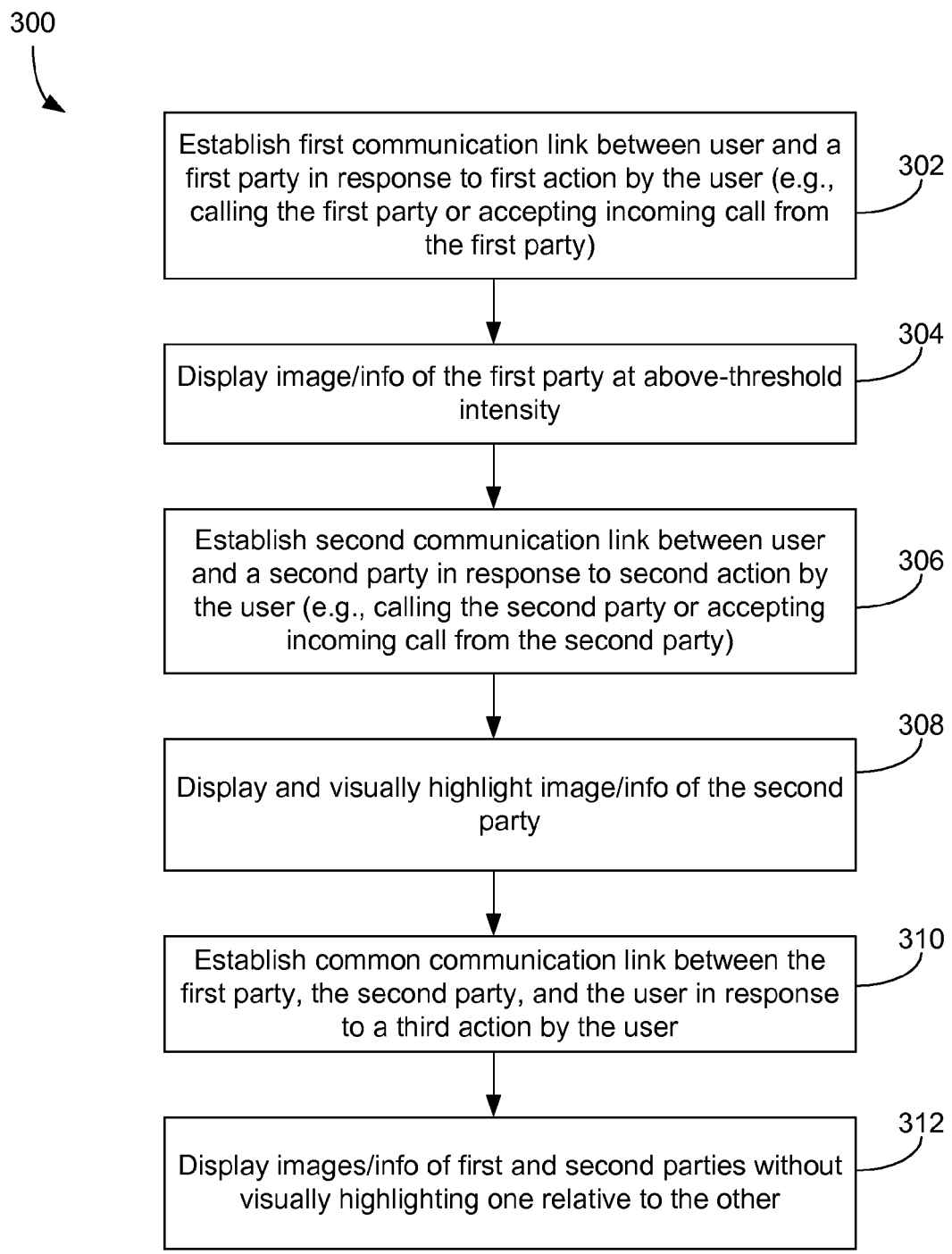
FIG. 3 is a flow diagram illustrating a process of displaying a graphical user interface for conveying information regarding multiple callers to a user in accordance with some embodiments.

Attention is now directed toward FIG. 3, a flow diagram illustrating a process 300 of displaying a graphical user interface for conveying information regarding multiple telephone call participants (which may include calling parties as well as called parties) in accordance with some embodiments. A first communication link is established between the user of the device and a first party (302). The first communication link (e.g., a first phone call) is established in response to a first action by the user. The first action may be the user accepting an incoming call from the first party, or the user making an outgoing call that is directed to and accepted by the first party. After the first communication link is established, information corresponding to the first party is displayed on the display of the device (304). The information is displayed at an intensity that is above a predefined intensity threshold. In some embodiments, the intensity at which the information is displayed is perceived by users as a fading effect or lack thereof. For example, a lower intensity (below the predefined intensity threshold) is perceived as a fading or translucence of the information on the display, and a higher intensity (above the predefined intensity threshold) is perceived as the opposite.

In some embodiments, the displayed information corresponding to the first party includes a picture associated with the first party. That picture may be a picture of the first party, or some other image that is associated with the first party. The picture may be retrieved from memory 102 (FIG. 1) associated with the device, where the picture is stored. In some embodiments, the first party is associated with a picture in an address book or contacts list 144 of the user device. In some other embodiments, the information may include a real-time video of an area in the vicinity of the first party, as captured by an optical sensor of a device associated with the first party and streamed by the first party device to the user device. If there is no picture or video stream associated with the first party, and if the phone number of the first party is associated with a name in the address book 144, the information displayed may include a name of the first party,. The information may otherwise include a phone number of the first party and an elapsed time of the first communication link.

While the first communication link is still ongoing, a second communication link is established between the user of the device and a second party (306). The second communication link (e.g., a second phone call) is established in response to a second action by the user. The second action may be the user accepting an incoming call from the second party, or the user making an outgoing call that is directed to and accepted by the second party. Upon establishing the second communication link, the user is switched away from the first communication link to the second communication link; the first communication link is put on hold.

After the second communication link is established, information corresponding to the second party is displayed on the display of the device (308). The second party information may be displayed while the first party information is still displayed on the display. Additionally, the information corresponding to the second party is visually highlighted. Similar to the information corresponding to the first party, the information corresponding to the second party may include a picture or video stream associated with the second party. If there is no picture or video stream associated with the second party, then the information displayed on the device may include a name of the second party. The information may otherwise include the phone number of the second party and an elapsed time of the second communications link. In some embodiments, there is a visible gap between the displayed information corresponding to the second party and the displayed information corresponding to the first party. The visual gap indicates that the first and second parties are on separate communication links.

The visual highlighting facilitates visual differentiation or disambiguation between the information corresponding to the first party and information corresponding to the second party. More particularly, the information corresponding to the second party is made visually more prominent than the information corresponding to the first party, as an indication that the second party is communicating with the user on an active communication link and the first party is on a communication link that is on hold. In some embodiments, the visual highlighting includes displaying the second party information at an intensity that is greater than the intensity of the displayed first party information. For example, the first party information may be displayed at an intensity less than the threshold and the second party information may be displayed at an intensity greater than the threshold. In some embodiments, the visual highlighting may include increasing the brightness, color, intensity, or thickness of a periphery around the second party information (e.g., turning the same periphery into a white color).

The user may want to return to communicating with the first party on the first communications link but without terminating the second communications link. The user may activate a call switching operation on the device, and the user is switched from the second link to the first link. After the switch, the visual highlighting of the information corresponding to the first and second parties is reversed; the first party information is visually highlighted relative to the second party information. For example, the first party information may be displayed at an intensity higher than the threshold and the second party information may be displayed at an intensity less than the threshold. The visual highlighting of the first party information provides an indication that the first party on the active first communication link is active and that the second party on the second communications link is on hold.

A common communication link may be established between the first party, the second party, and the user (310). The common communication link (e.g., a conference call) is established in response to a third action by the user. For example, the third action may be the user activation of a conference call operation on the device. The common link may be established by joining the first and second communication links into one communication link.

After the common communication link is established, the information corresponding to the first and second parties are displayed at the same time without visually highlighting one relative to the other (312). The information corresponding to the first and second parties are displayed together without making one more visually prominent than the other. For example, both the first party information and the second party information may be displayed at the same intensity. The absence of visual highlighting indicates to the user that both the first and second parties are communicating with the user on the same common communication link. In some embodiments, the first party information and the second party information are displayed adjacent to each other. Furthermore, in some embodiments, the information is displayed such that a periphery of the first party information is in contact with a periphery of the second party information, to further emphasize that both the first and second parties are communicating with the user on the same common communication link.

The user may wish to end the common communication link and communicate with the parties of the common communication link in separate communication links. That is, the user may wish to break up the conference call into separate calls with each of the parties. The user may select an option on the device to end the common communication link, establish first and second communication links with the first and second parties, respectively, and make one of the two links active while putting the other on hold. The information corresponding to the party on the active communication link is visually highlighted relative to the other, as described above.

In some embodiments, while the first communication link is ongoing, a second communication link may be joined with the first link into a common communication link without first switching to the second link and putting the first link on hold. That is, a common communication link may be established without first having both an active communication link and an on-hold communication link. In this case, the second party information need not be displayed and visually highlighted first before displaying both the first and second party information together without visually highlighting one relative to the other.

Figure 4A:
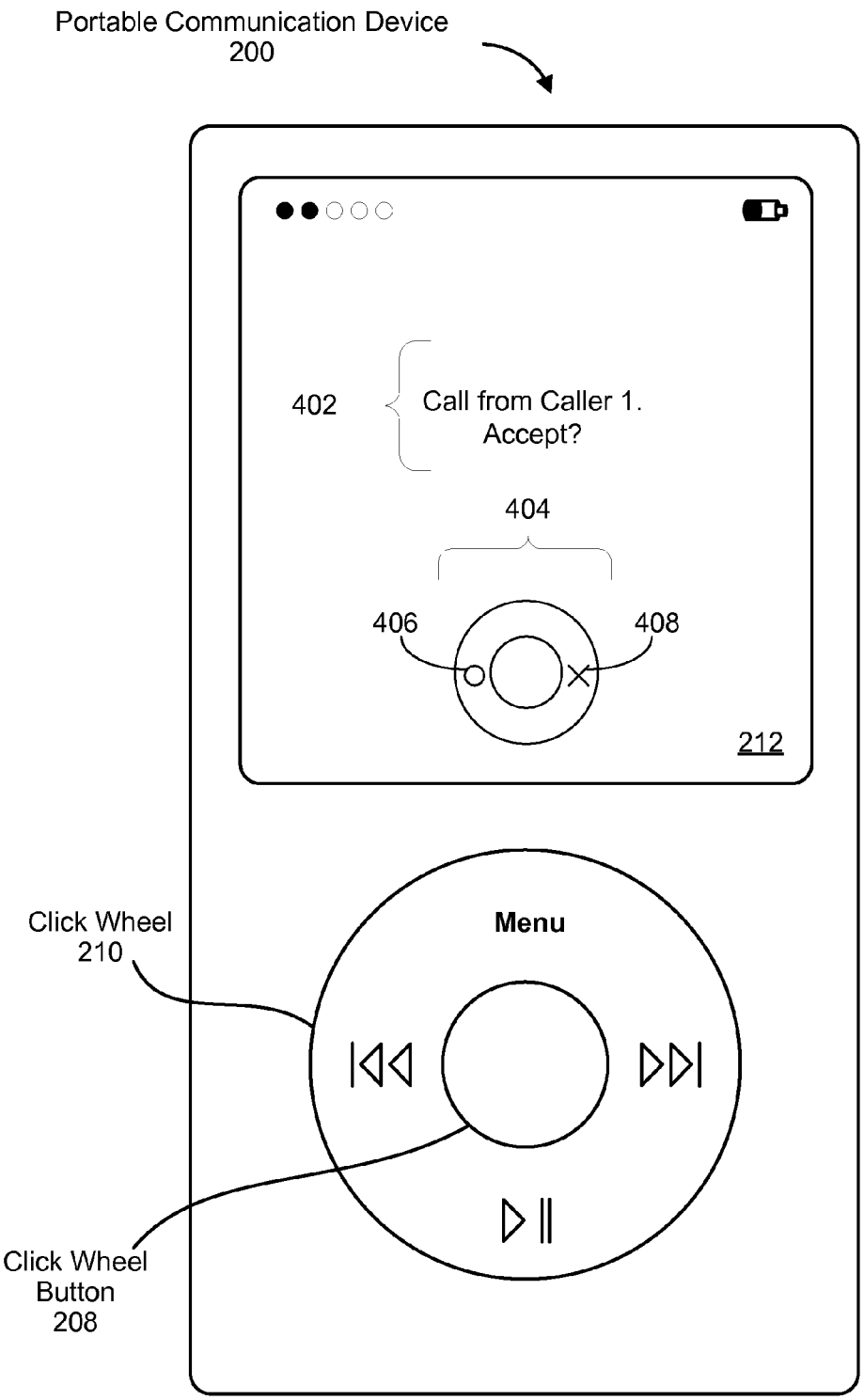
FIGS. 4A-4F illustrate exemplary graphical user interfaces for conveying information regarding multiple callers in accordance with some embodiments.

Attention is now directed to FIGS. 4A-4F, which are exemplary graphical user interfaces for conveying information regarding multiple callers in accordance with some embodiments. In FIG. 4A, the portable communications device 200 is displaying on the display 212 a graphical user interface (GUI) for accepting a call. The GUI includes a prompt 402 indicating a first incoming call from a first caller (hereinafter "Caller 1") and a prompt to accept or decline the call.

The GUI also includes an instructional image 404. The instructional image 404 includes a virtual representation of the click wheel 210 and the click wheel button 208. The instructional image 404 also includes icons, such as an accept call icon 406 and a decline/end call icon 408, displayed on particular positions on the instructional image 404. An icon represents a particular operation that may be activated by the user via the click wheel 210 or the click wheel button 208. The positions on the instructional image 404 on which the icons are displayed corresponds to positions on the click wheel 210 or click wheel button 208. The user activates an operation represented by an icon by pressing or making contact with the click wheel 210 or click wheel button 208 on the position corresponding to the position on the instructional image 404 where the icon is displayed. For example, the accept call icon 406 is displayed on the west position on the click wheel representation of the instructional image 404. Thus, if the user wishes to accept the incoming call as indicated by the prompt 402, the user presses or makes contact with the click wheel 210 at the west position. Similarly, to decline the call, the user presses or makes contact with the click wheel 210 at the east position, as indicated by the decline call icon 408 displayed on the east position of the click wheel representation of the instructional image 404.

Figure 4B:
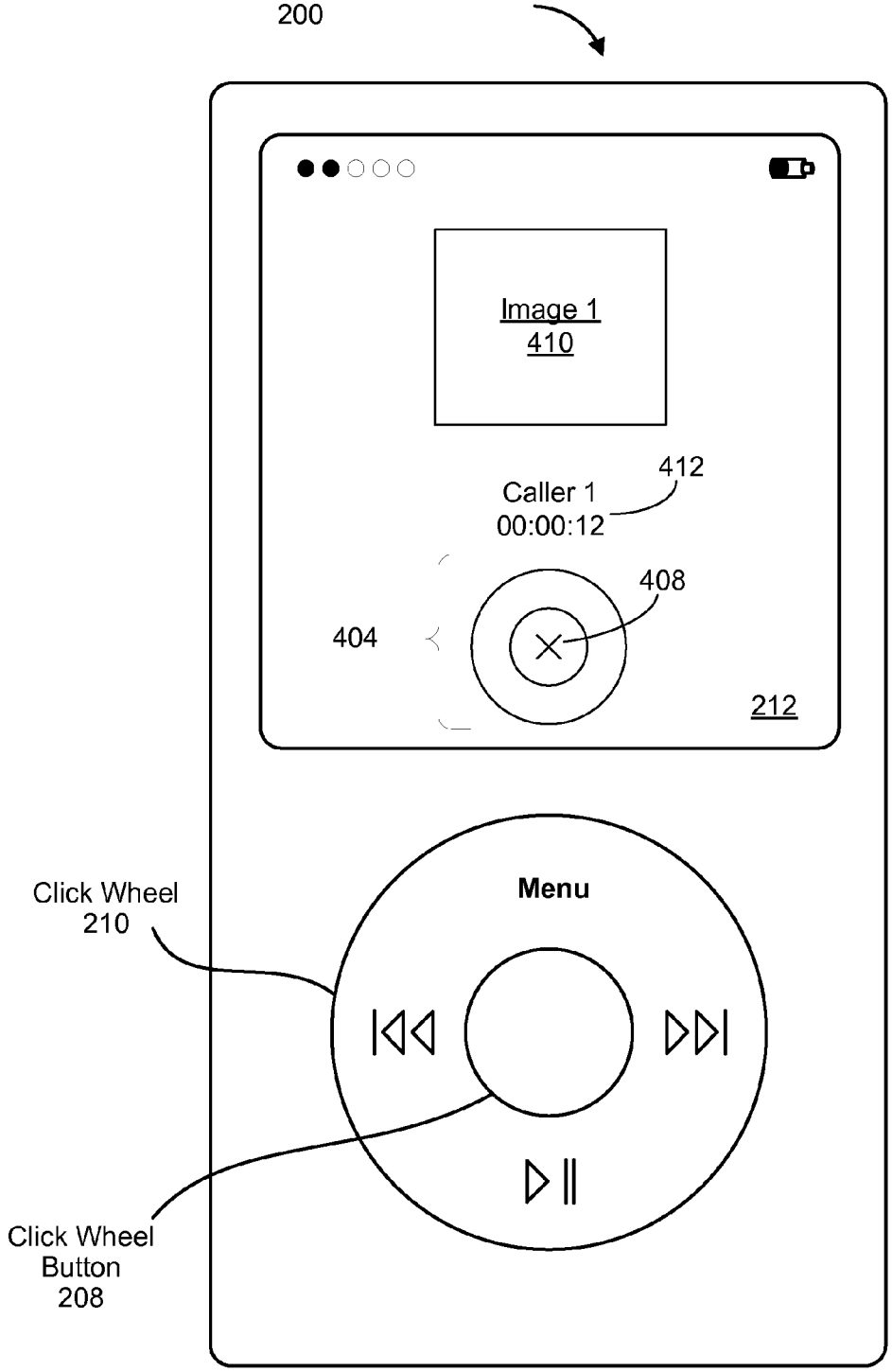

If the user accepts the call, the GUI changes to an active call GUI as shown in FIG. 4B. An image 410 associated with Caller 1 (hereinafter "Image 1") and information 412 associated with the first call are displayed on the display 212. The first call information 412 may include the name and/or phone number of Caller 1 and the elapsed time of the call. In some embodiments, the instructional image 404 displays the decline/end call icon 408 at the center position corresponding to the click wheel button 208. Thus, if the user wishes to end the first call, the user presses or makes contact with the click wheel button 208. The image shown as Image 1 410 is an image that is associated with Caller 1 in the device 200. The association may come from an address book entry for Caller 1 in the device 200, where the user links Caller 1 with a particular image. Image 1 need not be a picture of Caller 1; the image may be any image that the user associates with Caller 1 in the device 200. If there is no image associated with Caller 1 in the device 200, the name and/or phone number of Caller 1, or an image placeholder, such as a generic silhouette, may be displayed at the location where Image 1 410 would have been displayed.

Figure 4C:
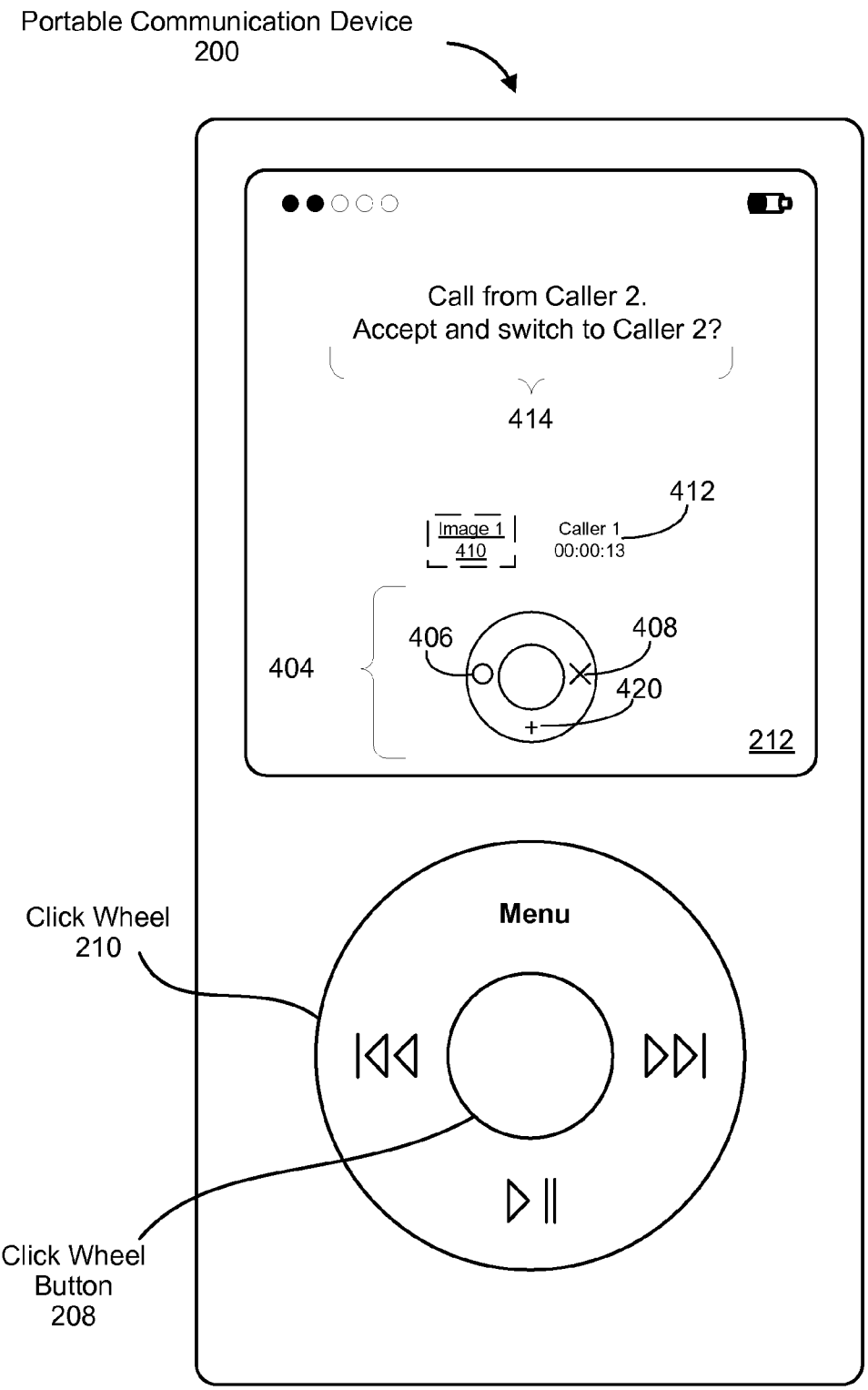

While the call with Caller 1 is active, another incoming call may be received, and the GUI changes to a call waiting GUI as shown in FIG. 4C. A prompt 414 indicating a second incoming call from a second caller (hereinafter "Caller 2) is displayed. Meanwhile, Image 1 410 and the first call information 412 may be shifted aside or below and reduced in size to make room for the prompt 414. In some embodiments, Image 1 410 and the first call information 412 may be displayed at a lower intensity while the second call prompt 414 is displayed. On the instructional image 404, the accept call icon 406 and the decline/end call icon 408 are displayed to indicate to the user the click wheel positions that will activate these operations. In some embodiments, a conference call icon 420 is also displayed on the instructional image 404 to indicate to the user the click wheel position that, when pressed by the user, will join the first and second calls into a conference call. When the user activates the conference call option, the second call is accepted and joined with the first call, forming a conference call between the user, Caller 1, and Caller 2.

Figure 4D:
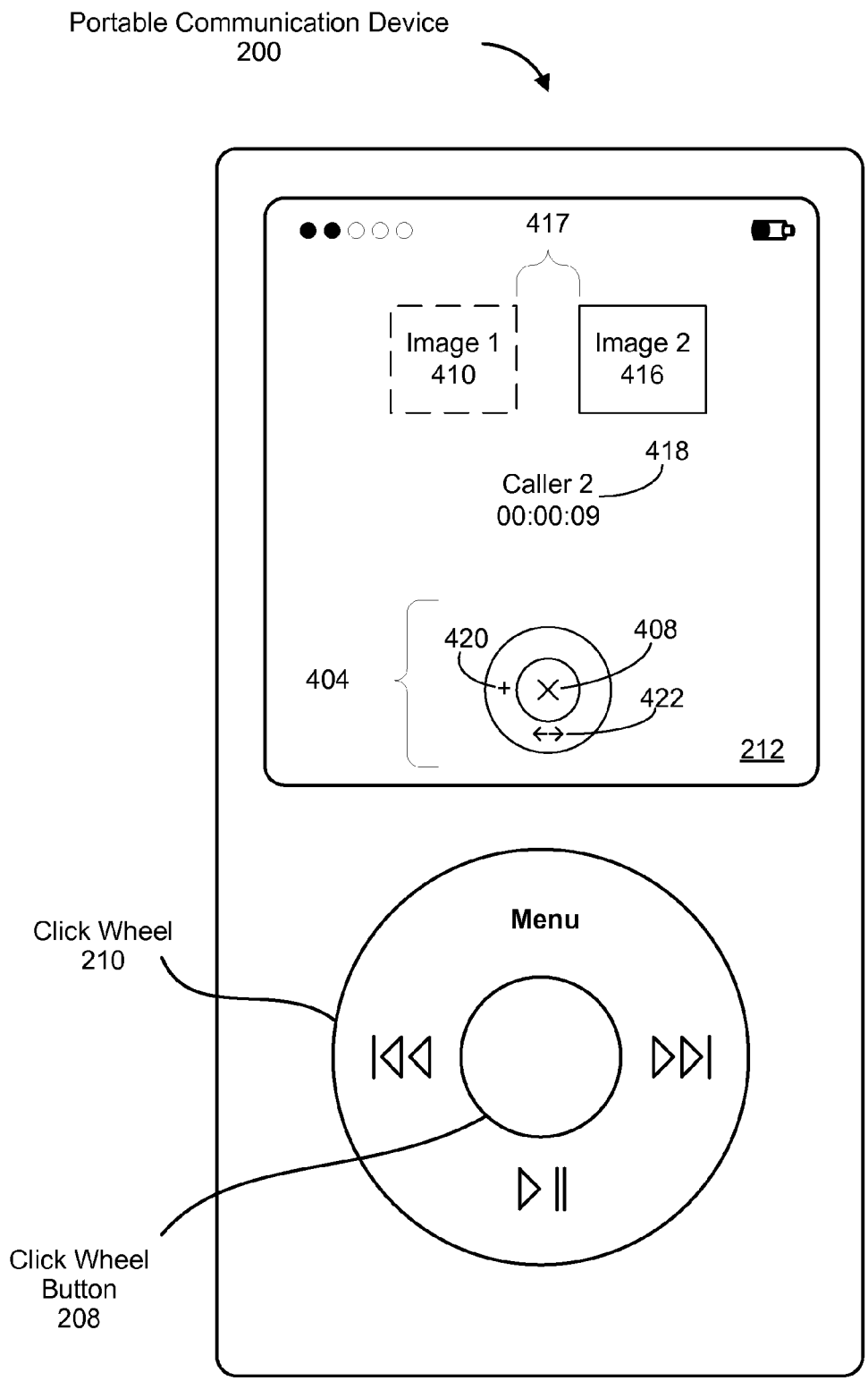

If the user accepts the second call (but does not activate the conference call option), an image 416 associated with Caller 2 (hereinafter "Image 2") and information 418 associated with the second call are displayed, as shown in FIG. 4D. The second call information 418 includes the name and/or phone number of Caller 2 and the elapsed time of the second call. Image 2 416 is displayed apart from Image 1 410, with a visible gap 417 between the two. Image 2 416 may be visually highlighted relative to Image 1 410, as represented by the solid periphery around Image 2 416 and the dotted line periphery around Image 1 410. In some embodiments, Image 2 416 is displayed at a higher intensity than Image 1 410. In some other embodiments, both Image 1 410 and Image 2 416 are enclosed in respective peripheries, and the periphery of Image 2 416 is displayed at a greater intensity, brightness, and/or thickness than the periphery of Image 1 410.

On the instructional image 404, aside from the decline/end call icon 408, a conference call icon 420 and a switch calls icon 422 may be displayed. As described above, the conference call icon 420 corresponds to a conference call option. When the conference call option is activated, the first call, which is on hold, is joined with the second call to form a conference call. The switch calls icon 422 corresponds to a switch calls option which, when activated by the user, makes the first call the active call and puts the second call on hold; the active call is switched from the second call to the first call. In some embodiments, the user indicates the call to make active by pressing the click wheel 210 on the position corresponding to the instructional image position where the switch calls icon 422 is displayed, and making an angular gesture on the click wheel 210 to the left or right, depending on the call that the user wishes to make active.

Figure 4E:
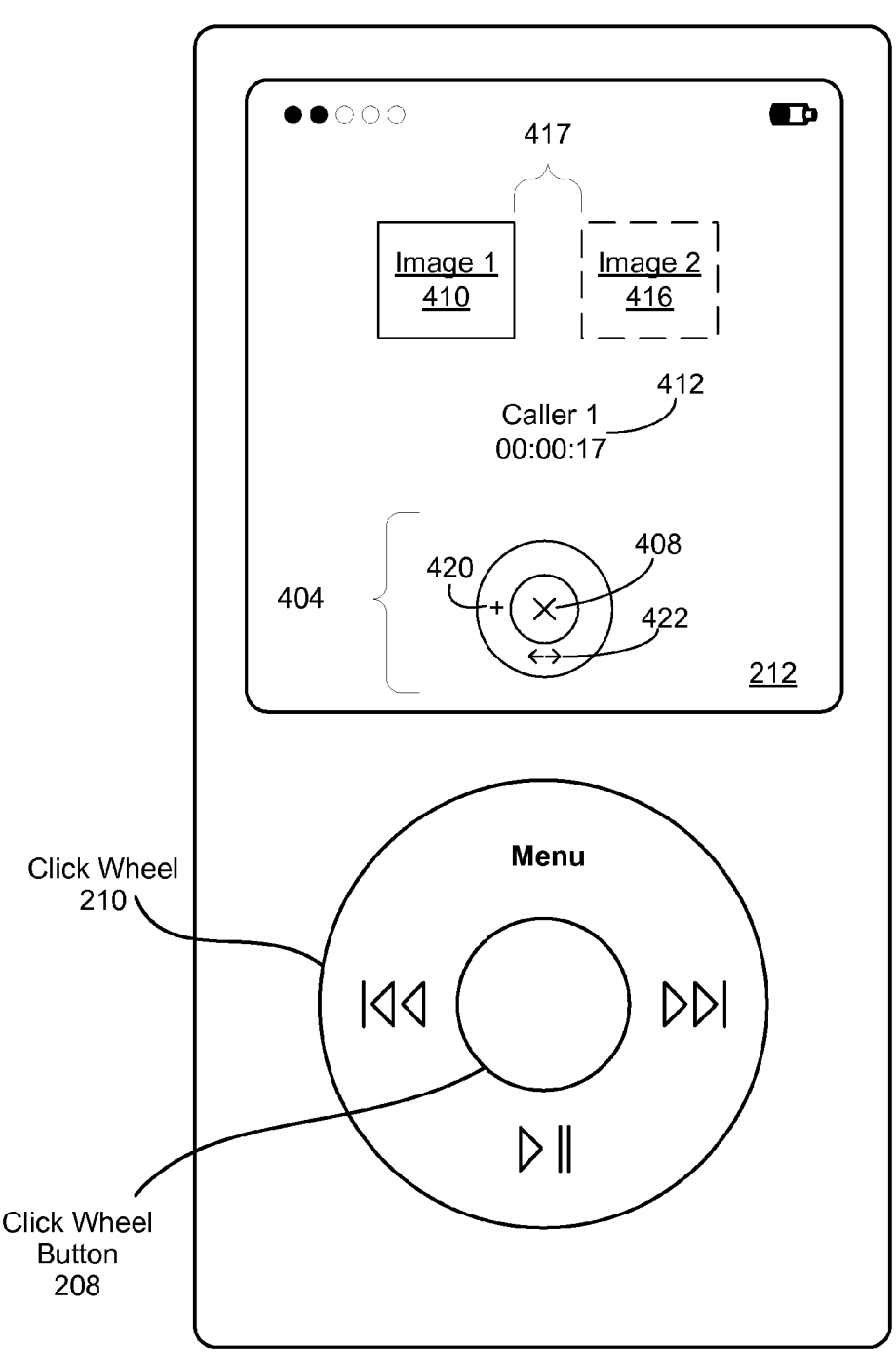

When the active call is switched to the first call, the visual highlighting of the images 410 and 416 are switched as well, as shown in FIG. 4E. That is, Image 1 410 is visually highlighted relative to Image 2 416. In some embodiments, Image 1 410 is displayed at a higher intensity than Image 2 416. In some other embodiments, both Image 1 410 and Image 2 416 are enclosed in respective peripheries, but the periphery of Image 1 410 is displayed at a greater intensity, brightness, and/or thickness than the periphery of Image 2 416. As in FIG. 4D, Image 2 416 and Image 1 410 are displayed with a visible gap 417 between the two. The decline/end call icon 408, conference call icon 420, and switch calls icon 422 may be displayed on the instructional image 404.

Figure 4F:
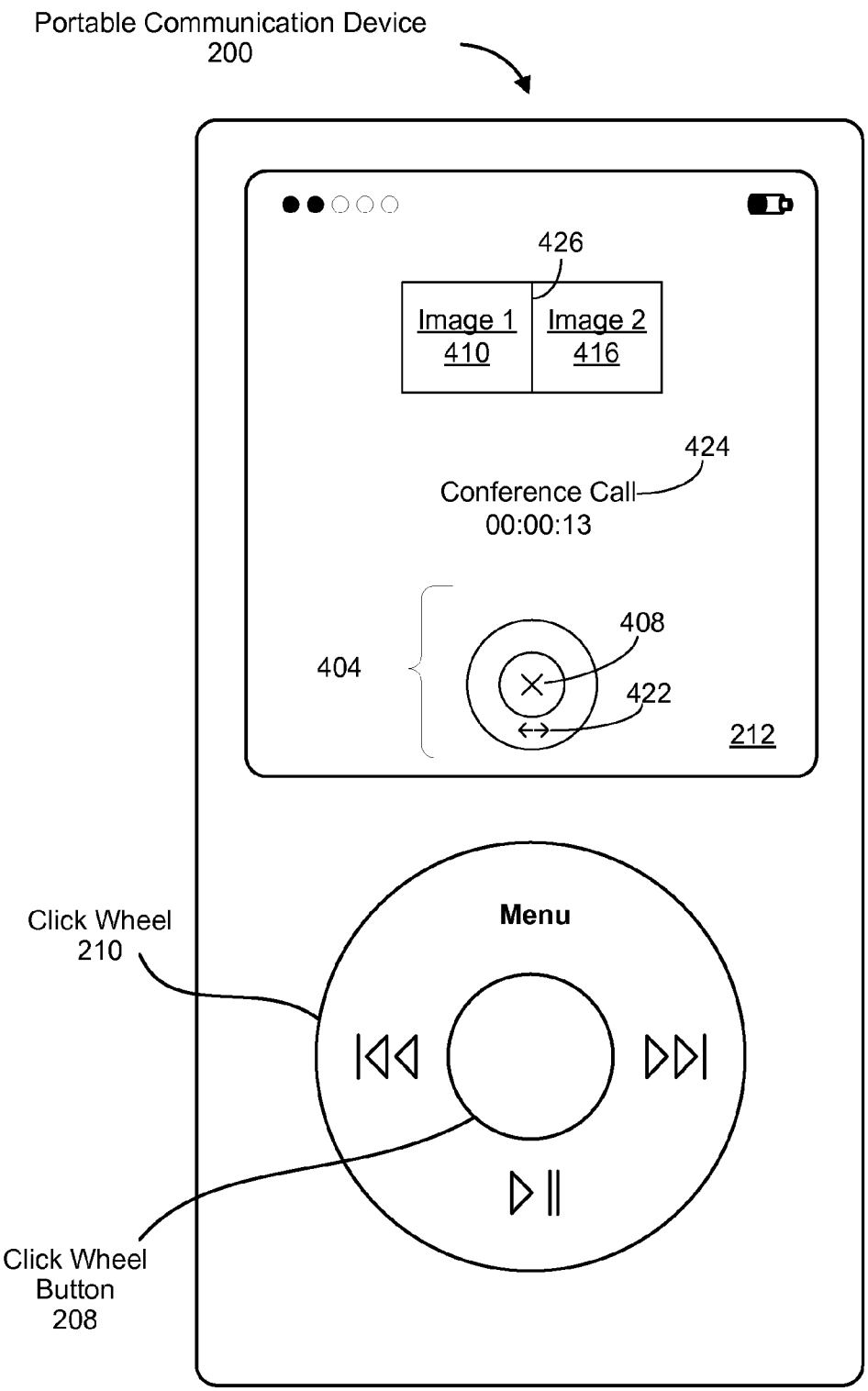

When the conference call option is activated, and the first and second calls are joined into a conference call and the conference call GUI is displayed, as shown in FIG. 4F. The GUI includes Image 1 410 and Image 2 416, representing the participants in the conference call aside from the user. Neither Image 1 410 nor Image 2 416 are visually highlighted relative to the other; both are displayed at substantially the same intensity or visual prominence. Furthermore, they are displayed more closely together than in the call waiting mode; the gap 417 is smaller or disappears altogether. In some embodiments, they are displayed adjacent to each other, with an edge of Image 1 410 in contact with an edge of Image 2 416. The contacting edges 426 provide an indication that Caller 1 and Caller 2 are both participating in the conference call. Additionally, information 424 associated with the conference call, such as the elapsed time, is displayed. On the instructional image 404, a decline/end call icon 408 and a switch calls icon 422 is displayed. Activation of the switch calls option breaks up the conference call into separate calls with Caller 1 and Caller 2 and puts one of the calls on hold.

It should be appreciated that while the description above describes the embodiments in the context of two parties (other than the user) on two communication links and a common communication link involving the two parties, the embodiments described above may be adapted to three or more parties on three or more communication links and a common communication link involving three or more parties.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a portable communications device:
establishing a first communication link between a first party and a user in response to a first action by the user;
displaying a first image corresponding to the first party at an intensity that is greater than a threshold;
while the first communication link is ongoing, establishing a second communication link between a second party and the user in response to a second action by the user;
switching the user from the first communication link to the second communication link;
while continuing to display the first image, displaying a second image corresponding to the second party with a visible gap between the first image and the second image;
visually highlighting the second image so as to facilitate visual differentiation of the first and second images, wherein visually highlighting comprises displaying the second image at an intensity that is greater than the threshold, and modifying the intensity of the first image to be less than the threshold; and,
in response to a third action by the user:
establishing a common communication link between the first party, the second party and the user;
displaying the first image and the second image at a same intensity; and
reducing or eliminating the visible gap between the first image and the second image.

2. A method, comprising:
at a portable communications device:
establishing a first communication link between a first party and a user in response to a first action by the user;
displaying a first image corresponding to the first party at an intensity that is greater than a threshold;
while the first communication link is ongoing, establishing a second communication link between a second party and the user in response to a second action by the user;
switching the user from the first communication link to the second communication link;
while continuing to display the first image, displaying a second image corresponding to the second party with a visible gap between the first image and the second image;
visually highlighting the second image so as to facilitate visual differentiation of the first and second images;
switching the user from the second communication link to the first communication link;
modifying the intensity of the first image to be greater than the threshold;
modifying the intensity of the second image to be less than the threshold;
in response to a third action by the user:
establishing a common communication link between the first party, the second party and the user;
displaying the first image and the second image at a same intensity; and
reducing or eliminating the visible gap between the first image and the second image.

3. The method of claim 1, wherein the first image includes information corresponding to the first party.

4. The method of claim 1, wherein the first image includes a stream of video images of the first party.

5. The method of claim 1, wherein the second image includes information corresponding to the second party.

6. The method of claim 1, wherein the second image includes a stream of video images of the second party.

7. A graphical user interface on a portable communications device with a display, a memory, and one or more processors to execute a program stored in the memory, the graphical user interface comprising:

a first image corresponding to a first party that is communicating with a device; and a second image corresponding to a second party that is communicating with the device, with a visible gap between the first image and the second image, wherein the first image has an intensity greater than a threshold and the second image has an intensity less than the threshold when a user of a device is communicating with the first party, wherein the first image has an intensity less than the threshold and the second image has an intensity greater than the threshold when the user is communicating with the second party, and wherein the first image has an intensity that is greater than the threshold and the second image has an intensity greater than the threshold when the user is communicating through a common link between the first party, the second party and the user;

and wherein, in response to an action by the user;
a common communication link is established between the first party, the second party, and the user;
the first image and the second image are displayed at a same intensity; and
the visible gap between first image and the second image is reduced or eliminated.

8. A non-transitory computer readable storage medium storing one or more programs, the one or more programs comprising instructions, which when executed by a portable communications device, cause the portable communications device to perform a method comprising:
establishing a first communication link between a first party and a user in response to a first action by the user;
displaying a first image corresponding to the first party at an intensity that is greater than a threshold;
establishing a second communication link, while the first communication link is ongoing, between a second party and the user in response to a second action by the user;
switching the user from the first communication link to the second communication link;
displaying a second image corresponding to the second party while continuing to display the first image with a visible gap between the first image and the second image;
visually highlighting the second image so as to facilitate visual differentiation of the first and second images, wherein visually highlighting comprises displaying the second image at an intensity that is greater than the threshold, and modifying the intensity of the first image to be less than the threshold; and,
in response to a third action by the user:
establishing a common communication link between the first party, the second party and the user;
displaying the first image and the second image at a same intensity; and
reducing or eliminating the visible gap between the first image and the second image.

9. A portable communications device, comprising:
a display;
one or more processors;
memory; and
a program, wherein the program is stored in the memory and configured to be executed by the one or more processors, the program including instructions for:
establishing a first communication link between a first party and a user in response to a first action by the user;
displaying a first image corresponding to the first party at an intensity that is greater than a threshold;
establishing a second communication link, while the first communication link is ongoing, between a second party and the user in response to a second action by the user;
switching the user from the first communication link to the second communication link;
displaying a second image corresponding to the second party while continuing to display the first image with a visible gap between the first image and the second image;
visually highlighting the second image so as to facilitate visual differentiation of the first and second images, wherein visually highlighting comprises displaying the second image at an intensity that is greater than the threshold, and modifying the intensity of the first image to be less than the threshold;
in response to a third action by the user:
displaying the first image and the second image at a same intensity; and
reducing or eliminating the visible gap between the first image and the second image.

10. The non-transitory computer readable storage medium of claim 8, wherein the first image includes a stream of video images of the first party.

11. The non-transitory computer readable storage medium of claim 8, wherein the second image includes a stream of video images of the second party.

12. The portable communications device of claim 9, wherein the first image includes a stream of video images of the first party.

13. The portable communications device of claim 9, wherein the second image includes a stream of video images of the second party.

14. A non-transitory computer readable storage medium storing one or more programs, the one or more programs comprising instructions, which when executed by a portable communications device, cause the portable communications device to perform a method comprising:
establishing a first communication link between a first party and a user in response to a first action by the user;
displaying a first image corresponding to the first party at an intensity that is greater than a threshold;
establishing a second communication link, while the first communication link is ongoing, between a second party and the user in response to a second action by the user;
switching the user from the first communication link to the second communication link;
displaying a second image corresponding to the second party while continuing to display the first image with a visible gap between the first image and the second image;
visually highlighting the second image so as to facilitate visual differentiation of the first and second images;
switching the user from the second communication link to the first communication link;
modifying the intensity of the first image to be greater than the threshold;
modifying the intensity of the second image to be less than the threshold;
in response to a third action by the user:
establishing a common communication link between the first party, the second party and the user;
displaying the first image and the second image at a same intensity; and
reducing or eliminating the visible gap between the first image and the second image.

15. A portable communications device, comprising:
a display;
one or more processors;
memory; and
a program, wherein the program is stored in the memory and configured to be executed by the one or more processors, the program including instructions for:
  establishing a first communication link between a first party and a user in response to a first action by the user;
  displaying a first image corresponding to the first party at an intensity that is greater than a threshold;
  establishing a second communication link, while the first communication link is ongoing, between a second party and the user in response to a second action by the user;
  switching the user from the first communication link to the second communication link;
  displaying a second image corresponding to the second party while continuing to display the first image with a visible gap between the first image and the second image;
  visually highlighting the second image so as to facilitate visual differentiation of the first and second images;
  switching the user from the second communication link to the first communication link;
  modifying the intensity of the first image to be greater than the threshold;
  modifying the intensity of the second image to be less than the threshold;
  in response to a third action by the user:
    establishing a common communication link between the first party, the second party and the user;
    displaying the first image and the second image at a same intensity; and
  reducing or eliminating the visible gap between the first image and the second image.

16. The method of claim 2, wherein the first image includes information corresponding to the first party.

17. The method of claim 2, wherein the first image includes a stream of video images of the first party.

18. The method of claim 2, wherein the second image includes information corresponding to the second party.

19. The method of claim 2, wherein the second image includes a stream of video images of the second party.

20. The graphical user interface of claim 7, wherein the first image includes information corresponding to the first party.

21. The graphical user interface of claim 7, wherein the first image includes a stream of video images of the first party.

22. The graphical user interface of claim 7, wherein the second image includes information corresponding to the second party.

23. The graphical user interface of claim 7, wherein the second image includes a stream of video images of the second party.

24. The non-transitory computer readable storage medium of claim 8, wherein the first image includes information corresponding to the first party.

25. The non-transitory computer readable storage medium of claim 8, wherein the second image includes information corresponding to the second party.

26. The portable communications device of claim 9, wherein the first image includes information corresponding to the first party.

27. The portable communications device of claim 9, wherein the second image includes information corresponding to the second party.

28. The non-transitory computer readable storage medium of claim 14, wherein the first image includes information corresponding to the first party.

29. The non-transitory computer readable storage medium of claim 14, wherein the first image includes a stream of video images of the first party.

30. The non-transitory computer readable storage medium of claim 14, wherein the second image includes information corresponding to the second party.

31. non-transitory computer readable storage medium of claim 14, wherein the second image includes a stream of video images of the second party.

32. The portable communications device of claim 15, wherein the first image includes information corresponding to the first party.

33. The portable communications device of claim 15, wherein the first image includes a stream of video images of the first party.

34. The portable communications device of claim 15, wherein the second image includes information corresponding to the second party.

35. The portable communications device of claim 15, wherein the second image includes a stream of video images of the second party.

* * * * *